H. R. HOYT.
DEMOUNTABLE RIM FOR VEHICLE WHEELS.
APPLICATION FILED MAY 3, 1917.

1,257,606. Patented Feb. 26, 1918.

Inventor
Hallie R. Hoyt
By
Henry L. Reynolds
Attorney

UNITED STATES PATENT OFFICE.

HALLIE RAY HOYT, OF SEATTLE, WASHINGTON.

DEMOUNTABLE RIM FOR VEHICLE-WHEELS.

1,257,606. Specification of Letters Patent. Patented Feb. 26, 1918.

Application filed May 3, 1917. Serial No. 166,243.

*To all whom it may concern:*

Be it known that I, HALLIE RAY HOYT, a citizen of the United States, and resident of the city of Seattle, county of King, and State of Washington, have invented certain new and useful Improvements in Demountable Rims for Vehicle-Wheels, of which the following is a specification.

My invention relates to wheel rims, and more particularly to a demountable rim designed to be used in connection with a permanent wheel center.

The object of my invention is to provide a demountable or removable rim, so constructed that it may be readily collapsed a sufficient amount to permit the ready application and removal of a tire.

My invention comprises those novel constructions and combinations of parts which will be hereinafter described and then particularly defined by the claims.

In the accompanying drawings I have shown my invention embodied in the form of construction which is now most preferred by me.

Figure 1:
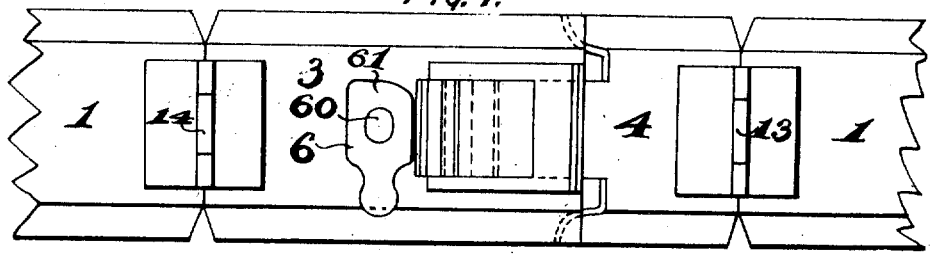
Figure 1 is an inside view of the section of the rim which is provided with the means for collapsing the same, said parts being in collapsed condition.
Figure 2:
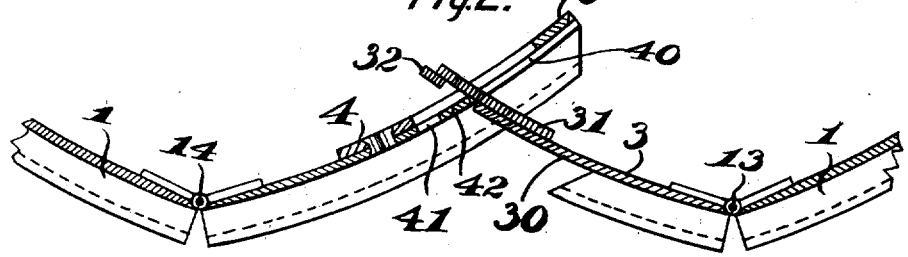
Fig. 2 is a longitudinal section through the corresponding sections of a rim, the parts being also in collapsed condition.

In the use of demountable rims a great difficulty is often found in applying tires thereto, or removing them therefrom, due to the fact that such rims are often provided with retaining flanges and it is difficult to get the tire over the flange. The same difficulty of removal and displacement also occurs when the flange on one side is omitted, due to the grip of the tire upon the rim.

By the present invention, I construct the demountable rim in such manner that it may be collapsed to a sufficient extent to be loosened from and permit ready removal of the tire, even when the rim has a flange on each side.

In my invention the major part of such a rim is made integral, or as a single piece, in which the ends are separated a sufficient distance to accommodate the locking and collapsing sections. The ends of this major section are shown at 1. Between the ends of the section 1 are placed two collapsing sections 3 and 4. These intermediate sections are hinged at 13 and 14, each to its respective end of the major section 1. One of these sections, as the section 3, is cut down so as to form a projecting tongue 30. This tongue projects in a direction to overlap the complemental section 4.

Section 4 has a corresponding notch 40 formed in its end 4 and adapted to receive the tongue 30 when the parts are in distended position. The section 4 has a plate 5 secured to its inner surface. This plate is of U-shape. The base of the U extends transversely across the rim and is secured thereto so as to bridge the outer end of the opening or notch 40. The side arms 50 extend backward along the margin of the notch or recess 40.

The section 3 has a plate 31 secured to its inner surface and projecting beyond the end of the tongue 30. This plate is of a width and thickness corresponding with the width of the opening 40 in section 4 and to the thickness of the arms 50 of plate 5. The outer or swinging end of the plate 31 has a bar 32 secured thereto at a distance from the end of the tongue 30, and of a width substantially corresponding with the width of the plate 31. The section 4 has a hole 41 cut therein in such a position and of such a size as to snugly receive the bar 32 when the intermediate sections have been forced outward.

Figure 3:
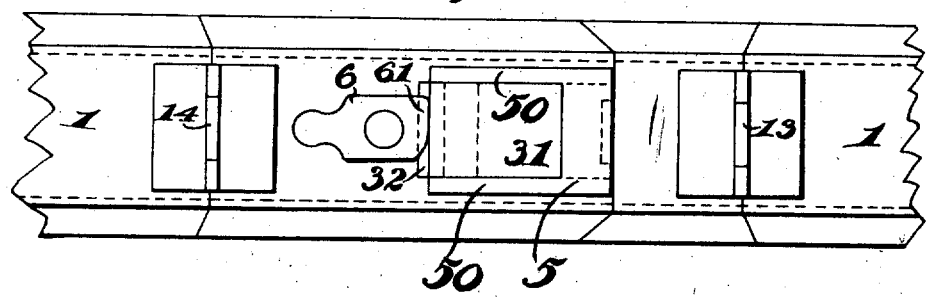
Figs. 3 and 4 are, respectively, an inside face view and a longitudinal section through the same parts shown in locked or distended position.
Figure 4:
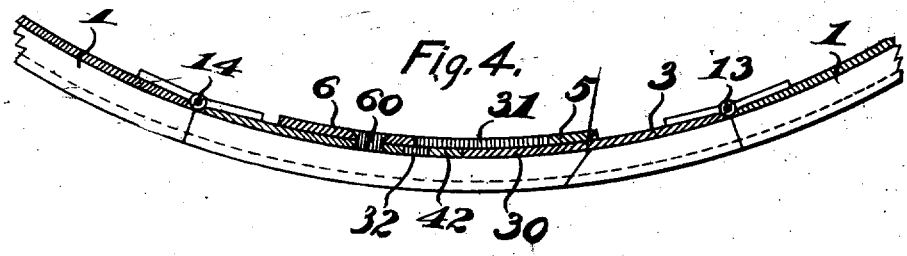
Figure 5:
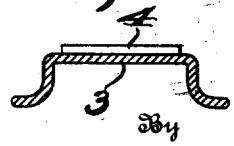
Fig. 5 is a cross section of the type of rim illustrated in the other figures.

The transversely extending portion of the plate 5, being the portion which bridges the outer end of the notch 40, is so placed that its inner edge is spaced from the inner edge of the notch 40 a distance corresponding to the distance between the outer end of the tongue 30 and the inner edge of the plate 31, so that when the intermediate sections are pressed outwardly, or into the positions shown in Figs. 3 and 4, the outer end of the tongue 30 will bear firmly against the outer edge of the portion 42 of plate 4, which lies between the notch 40 and the hole 41, and the inner edge of the plate 31 will rest close up to the cross bar 5. In the same position the bar 32 snugly fits into the hole 41.

To further lock these parts in position so as to prevent accidental collapse, I may provide a cam or locking lever 6, which is pivoted upon a pin 60 and is so placed on the inner surface of the section 4, that its edge will contact with the extreme outer edge of the plate 31 when turned in locking position. The side projection of this locking lever 6 is enough less than the end projection that the bar 32 may freely pass into the hole 41 when the locking lever is turned transversely of the rim. When the bar is turned lengthwise of the rim its locking end 61 will press against the outer plate 31 and overlap the outer half of the plate 32, thus preventing any possibility of collapse inward of the outer rim until this lock has been turned into its transverse position.

It is evident that such a rim may be readily collapsed sufficiently to permit free removal and replacement of a tire. Also, that its construction is one which may be made quite rigid.

What I claim as my invention is:

1. A demountable rim comprising a main section having its ends separated and two short sections hinged each to its end of the main section, one of said hinged sections having two slots therein and the other having a tongue passing through one of said slots and an offset bar entering the other slot, and means for locking said hinged sections in expanded position.

2. A demountable rim comprising a main section and two intermediate sections hinged to the ends of the main section, the adjacent ends of the intermediate sections having transversely extending slots spaced apart lengthwise the section with the transverse bar at the outermost side of the outermost slot displaced inwardly substantially the thickness of the material of the section and the other section having a tongue entering the outermost of said slots and having an interiorly projecting or offset plate adapted to fit against the innermost edge of the transverse bar at the end of the other section, and a transverse outwardly projecting bar fitting the other slot of the other section, and projecting beyond the end of its supporting tongue, and a locking button carried by the other swinging section and adapted to overlap said locking bar.

3. A collapsible wheel rim comprising a main section having its ends separated, and two sections pivoted each to its end of the main section, the swinging end of one of said intermediate sections having a notch cut inward from its end and a transverse slot inward from the base of said notch and having a reinforcing plate secured to its inner surface and extending far over the outer end of said section to beyond said transverse slot, said reinforcement having a slot extending from well toward the outer end of the section to its under end, the other pivoted section having a reinforcing plate on its inner surface adapted to pass through the slot in the other section and extending beyond the swinging end of its attached section, said reinforcement having a bar projecting outwardly and positioned to enter the inner transverse slot in the other section when the end of the main body of its section engages the bottom edge of the end slot in the other section.

4. A collapsible wheel rim comprising a main section having its ends separated and two sections hinged, each to its end of the main section, the swinging ends of both said latter sections having inwardly offset reinforcing plates, the main body of one of said sections being slotted inwardly from its outer end and also having a transverse slot inwardly from the bottom of said slot and its reinforcing plate having a slot of like width extending from near the outer end of the section to its inner end, the other swinging section having its sides cut down toward its outer end to form a tongue fitting the slot in the other section and when the rim is in expanded position filling the slot in the end of the main body of the other swinging section, the reinforcement for the same section being of like width as said tongue and positioned to have its inner end abut against the bottom of the notch in the reinforcement of the other section when the outer end of the said tongue abuts the bottom of the notch in the body of the other swinging section, the outer end of the reinforcing slot of said tongue extending partly over the transverse slot in the other swinging section and an outwardly projecting bar secured by this end of the tongue reinforcement and fitting said transverse slot.

Signed at Seattle, Washington, this 28th day of April, 1917.

HALLIE RAY HOYT.